US008907885B2

(12) United States Patent
Chen et al.

(10) Patent No.: US 8,907,885 B2
(45) Date of Patent: Dec. 9, 2014

(54) BACKLIGHT CONTROL APPARATUS AND ASSOCIATED METHOD

(75) Inventors: Yen-Ting Chen, Hsinchu Hsien (TW); Yi-Chun Weng, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 581 days.

(21) Appl. No.: 12/700,080

(22) Filed: Feb. 4, 2010

(65) Prior Publication Data
US 2010/0188440 A1    Jul. 29, 2010

Related U.S. Application Data

(63) Continuation-in-part of application No. 12/645,719, filed on Dec. 23, 2009.

(60) Provisional application No. 61/146,666, filed on Jan. 23, 2009.

(30) Foreign Application Priority Data

Oct. 22, 2009   (TW) .............................. 98135747 A

(51) Int. Cl.
| G09G 3/36 | (2006.01) |
| G09G 3/00 | (2006.01) |
| G09G 3/34 | (2006.01) |
| H04N 13/04 | (2006.01) |

(52) U.S. Cl.
CPC ................ *G09G 3/001* (2013.01); *G09G 3/342* (2013.01); *H04N 13/0438* (2013.01); *H04N 13/0497* (2013.01); *G09G 2310/024* (2013.01); *G09G 2320/02* (2013.01); *H04N 2213/002* (2013.01)
USPC .......................................... 345/102; 345/690

(58) Field of Classification Search
USPC .................................................. 345/102, 690
See application file for complete search history.

(56) References Cited

U.S. PATENT DOCUMENTS

| 2004/0183773 | A1* | 9/2004 | Song ............................. 345/102 |
| 2005/0184952 | A1* | 8/2005 | Konno et al. ................. 345/102 |
| 2009/0146942 | A1* | 6/2009 | Lee et al. ....................... 345/102 |
| 2010/0208043 | A1* | 8/2010 | Hoffman ......................... 348/53 |
| 2010/0289883 | A1* | 11/2010 | Goris et al. ...................... 348/56 |

FOREIGN PATENT DOCUMENTS

| CN | 1358032 | 7/2002 |
| CN | 101170709 | 4/2008 |

OTHER PUBLICATIONS

CN OA, Jul. 26, 2011.

* cited by examiner

*Primary Examiner* — William L Boddie
*Assistant Examiner* — Sahlu Okebato
(74) *Attorney, Agent, or Firm* — WPAT, PC; Justin King

(57) ABSTRACT

A backlight control apparatus is provided. The apparatus controls a backlight module of a liquid crystal display for displaying three-dimensional stereo images. The apparatus includes an image update progress detector and a backlight control signal generator. The image update progress detector detects an update progress of an image signal to generate an update progress signal. The backlight control signal generator generates a plurality of backlight control signals according to the update progress signal to respectively control backlight turn on/off time points of a plurality of backlight areas of the backlight module.

14 Claims, 5 Drawing Sheets

BACKLIGHT CONTROL APPARATUS AND ASSOCIATED METHOD

CROSS REFERENCE TO RELATED PATENT APPLICATION

This patent application claims the domestic priority over the Ser. No. 12/645,719 filed on Dec. 23, 2009, which is based on U.S. provisional patent application No. 61/146,666 filed on Jan. 23, 2009. This patent application also claims the foreign priority on the Taiwan, R.O.C. patent application No. 098135747 filed on Oct. 22, 2009.

FIELD OF THE INVENTION

The present invention relates to a backlight control apparatus of a liquid crystal display (LCD) and an associated method, and more particularly, to a backlight control apparatus of an LCD display for displaying three-dimensional (3D) stereo images and an associated method thereof.

BACKGROUND OF THE INVENTION

In the 3D stereo display technology, the 3D stereo display associated with a time sequence is considered quite mature. That is, images of the left eye and the right eye are alternately displayed on the basis of a time sequence so that the eyes of a viewer perceive the left-eye images and the right-eye images alternately. More particularly, the left eye of the viewer only perceives the left-eye images and the right eye of the viewer only perceives the right-eye images. For example, a pair of 3D stereo glasses, having a left-eye shutter and a right-eye shutter, associated with a display capable of alternately displaying the left-eye images and the right-eye images, can provide 3D stereo images to the viewer.

FIG. 1 shows a schematic diagram of timing control of 3D stereo images displayed by an LCD display and a pair of 3D stereo glasses in the prior art. The LCD display alternately displays left-eye images and right-eye images. Since the LCD display is a hold-type display, each of pixels of the LCD display displays current pixel data continuously before being updated. Therefore, as shown in the diagram, during an interval in which a display image of the LCD display is updated with a left-eye image, the display image (e.g., a display image of a time point Ta illustrated at the bottom of FIG. 1) of the LCD display actually contains not only an updated left-eye image, but also a right-eye image that is not yet updated. Upon entering a vertical blanking interval (VBI), the display image of the LCD display is completely updated with the updated left-eye image (e.g., a display image of a time point Tb illustrated at the bottom of FIG. 1). Likewise, during an interval in which the display image of the LCD display is updated with a right-eye image, the display image (e.g., a display image of a time point Tc illustrated at the bottom of FIG. 1) of the LCD display actually contains not only an updated right-eye image, but also a left-eye image that is not yet updated. Upon entering a vertical blanking interval (VBI), the display image of the LCD display is completely updated with the updated right-eye image (e.g., a display image of a time point Td illustrated at the bottom of FIG. 1).

In order to avoid crosstalk, the pair of 3D stereo glasses is only correspondingly switched to an open state during a VBI. For example, according to an open/closed timing line of a left-eye shutter illustrated in FIG. 1, the left-eye shutter of the pair of 3D stereo glasses is opened during the VBI after the left-eye images have been updated, and when the current display image begins to be updated with the right-eye images, both of the left-eye and right-eye shutters of the pair of 3D stereo glasses are closed. According to an open/closed timing line of a right-eye shutter illustrated in FIG. 1, the right-eye shutter of the pair of 3D stereo glasses is opened during a VBI after the right-eye images have been updated, and when the current display image begins to be updated with the left-eye images, both of the left-eye and right-eye shutters of the pair of 3D stereo glasses are closed. Accordingly, the conventional 3D stereo display always brings insufficient brightness in the images, and it is also rather power-consuming to increase the overall brightness of the LCD display. Therefore, by adjusting brightness, it remains impossible to provide pleasant view experience to viewers.

In addition, since eyes of a viewer only view images on the LCD display during a short interval in which the shutters are opened, the images are actually drastically flashed with respect to the viewer. Although most of the visual persistence effect is undetectable by human eyes, the drastic flash resulted from the VBI being much shorter than a frame period is nevertheless prone to tire eyes of the viewer. Therefore, the conventional 3D stereo display technology needs to be improved.

SUMMARY OF THE INVENTION

One object of the present invention is to provide a backlight control apparatus and an associated method.

A backlight control apparatus is provided according to the present invention. The apparatus, applied to an LCD display, controls a backlight module of the LCD display for displaying 3D stereo images. The apparatus comprises an image update progress detector and a backlight control signal generator. The image update progress detector detects an update progress of an image signal to generate an update progress signal. The backlight controls signal generator generates a plurality of backlight control signals according to the update progress signal to respectively control backlight turn on/off time points of a plurality of backlight areas of the backlight module.

An associated backlight control method is also provided according to the present invention. The method, applied to an LCD display, is for controlling a backlight module of the LCD display for displaying 3D stereo images. The method comprises detecting an update progress of an image signal to generate an update progress signal; and generating a plurality of backlight control signals according to the update progress signal to respectively control backlight turn on/off time points of a plurality of backlight areas of the backlight module.

DETAILED DESCRIPTION OF THE PREFERRED EMBODIMENT

According to a backlight control apparatus and an associated method in accordance with embodiments of the present invention, backlights of backlight areas of a backlight module of an LCD display are turned on/off according to an update progress of a display image to significantly increase opening durations of shutters of a pair of 3D stereo glasses. Accordingly, a viewer is given enough image brightness when viewing 3D stereo images so that a problem of tiring the eyes due to insufficient brightness is avoided.

Figure 1:
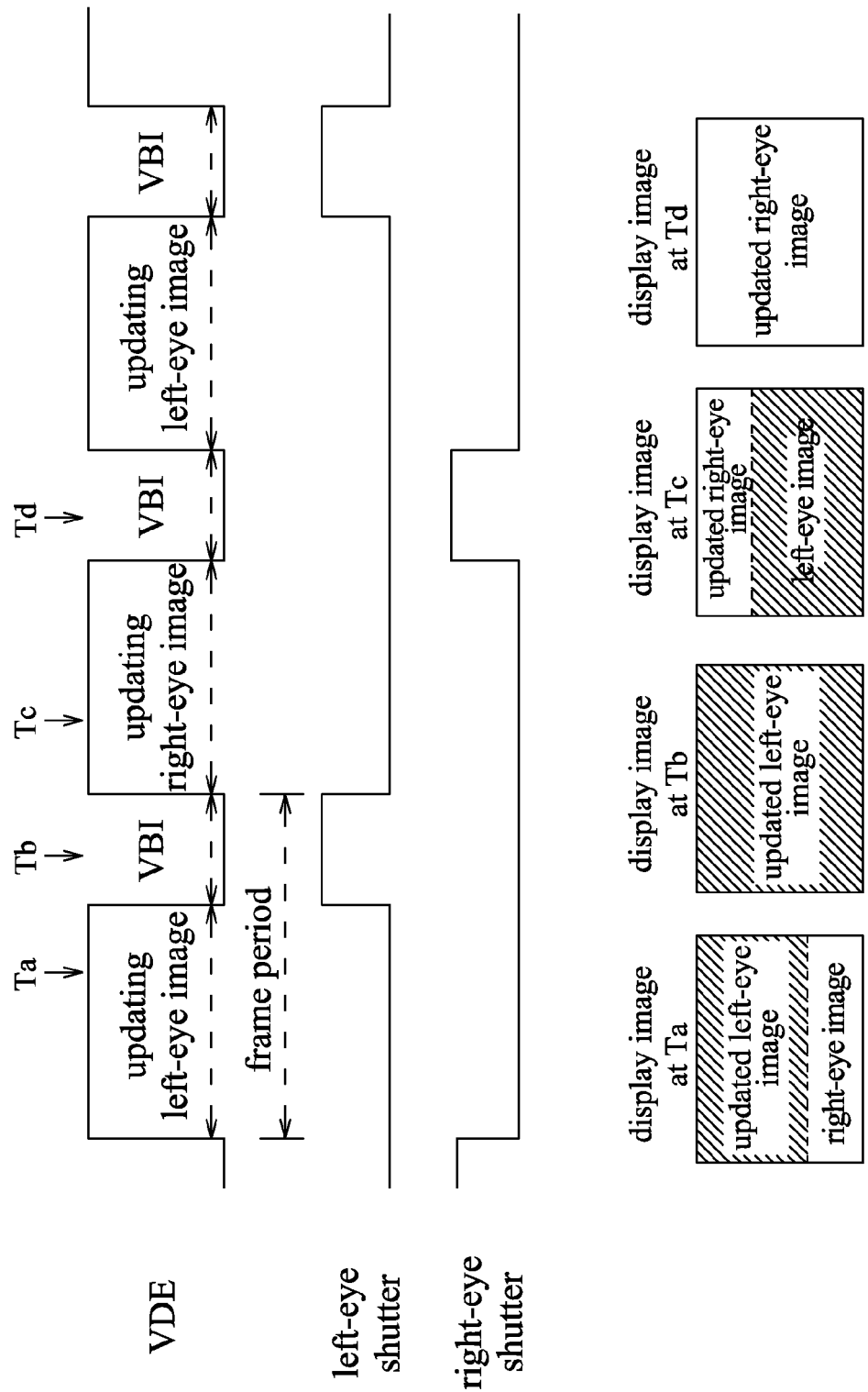
FIG. 1 is a schematic diagram a schematic diagram of a display timing control of 3D stereo images displayed by an LCD display and a pair of 3D stereo glasses in the prior art.
Figure 2:
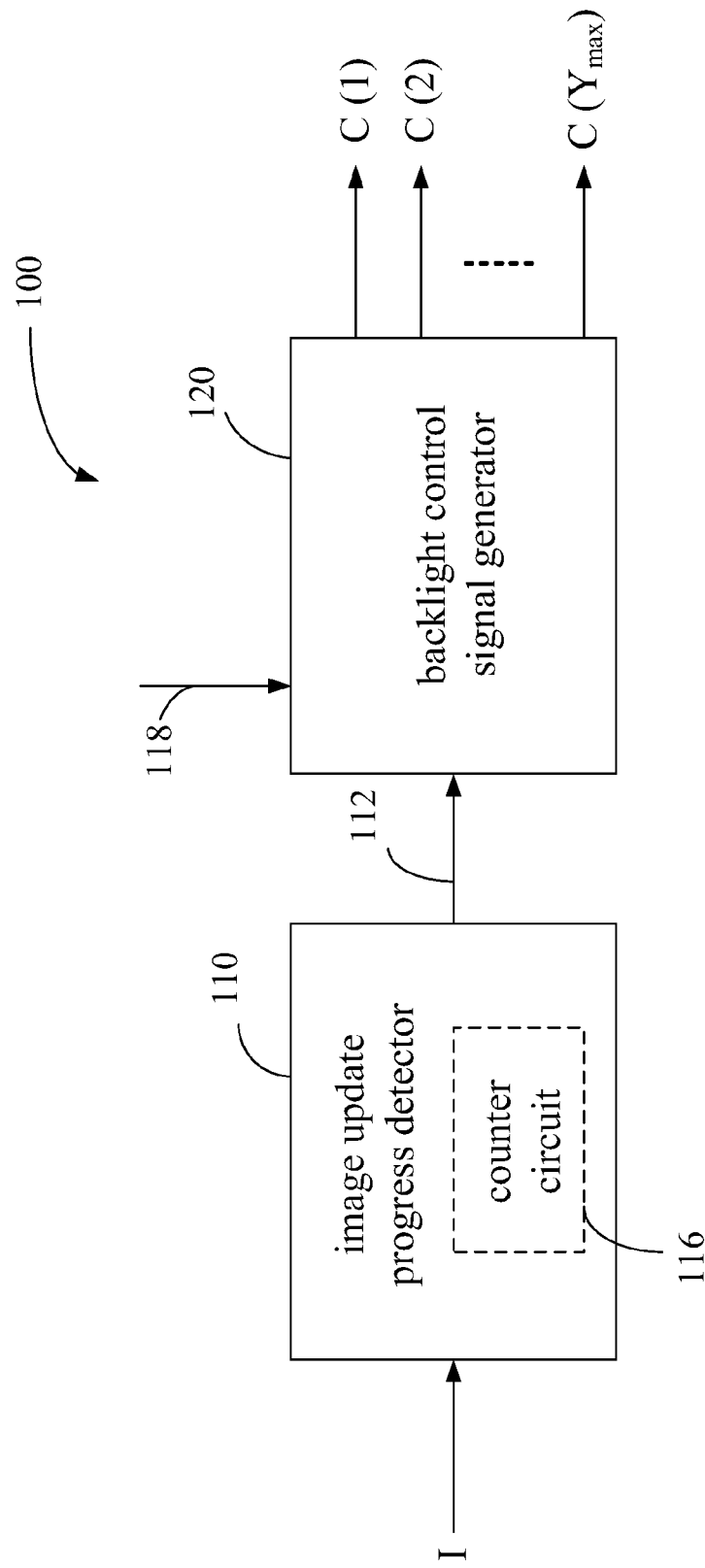
FIG. 2 is a schematic diagram of a backlight control apparatus in accordance with an embodiment of the present invention.

FIG. 2 is a schematic diagram of a backlight control apparatus 100 in accordance with a first embodiment of the present invention. The backlight control apparatus 100 controls a backlight module of an LCD display for displaying 3D stereo images. In this embodiment, the backlight module comprises light emitting diodes (LEDs). The backlight control apparatus 100 comprises an image update progress detector 110 and a backlight control signal generator 120. In practice, the image update progress detector 110 comprises a counter circuit 116; however, the examples are disclosed for illustration purposes and shall not be construed as limiting the present invention.

Figure 3:
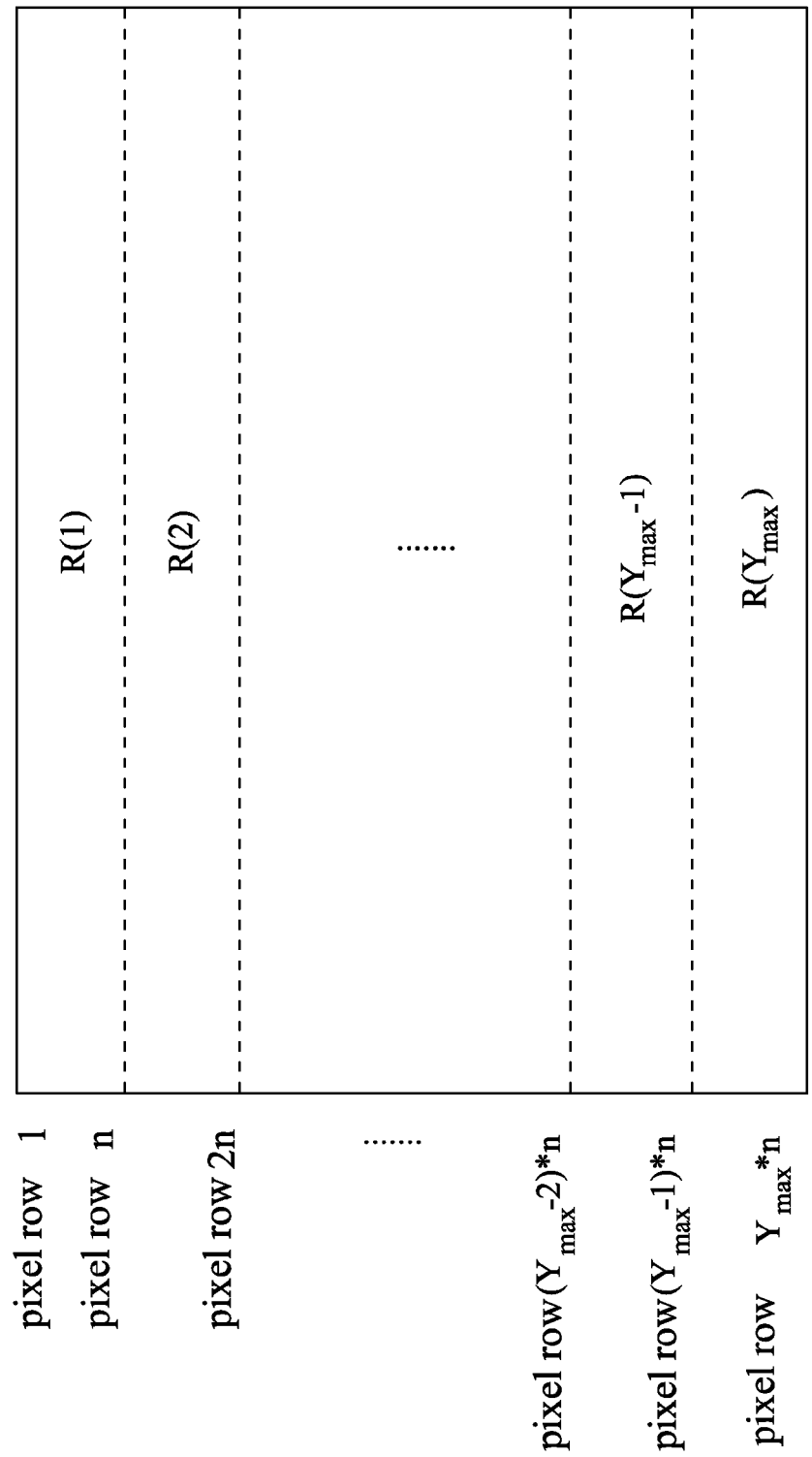
FIG. 3 is a schematic diagram of a display area of an LCD display comprising the backlight control apparatus illustrated in FIG. 2.

FIG. 3 is a schematic diagram of a display area of an LCD display comprising the backlight control apparatus 100 illustrated in FIG. 2. According to a plurality of independently controlled backlight areas of the backlight module of the LCD display, the display areas are divided from the top to the bottom into banded areas R(1), R(2), ..., R($Y_{max}$–1), and R($Y_{max}$), which are generally referred to as R(Y), where Y may be from 1 to $Y_{max}$; and each display area comprises N rows of pixels.

According to this embodiment, the image update progress detector 110 detects an update progress of an image signal I to be displayed on the LCD display to generate an update progress signal 112 corresponding to the update progress. For example, the image update progress detector 110 detects that a frame of the image signal I is updated to a $2n^{th}$ pixel row, so as to generate the update progress signal 112 representing the update progress for the $2n^{th}$ pixel row. The image update progress detector 110 dynamically transmits the update progress signal 112 to the backlight control signal generator 120, such that the backlight control signal generator 120 can obtain a latest image update progress at all times.

In addition, according to the update progress signal 112, the backlight control signal generator 120 generates a plurality of backlight control signals, e.g., backlight control signals C(1), C(2), ..., and C($Y_{max}$) that are generally referred to as C(Y), to control backlight turn on/off time points of the backlight areas. Referring to FIG. 3, the display area of the LCD display comprises a plurality of banded areas arranged in sequence, and backlight of the banded areas are turned on from the top to the bottom according to the update progress of a frame of the image signal I in a frame period, such that the banded areas have different illumination time points according to the update progress. For example, when the update progress signal 112 generated by the image update progress detector 110 indicates that the update progress of the frame is beyond the $2n^{th}$ pixel row, the backlight control signal generator 120 turns on the backlight of the banded area R(2) according to the backlight control signal C(2).

Figure 4:
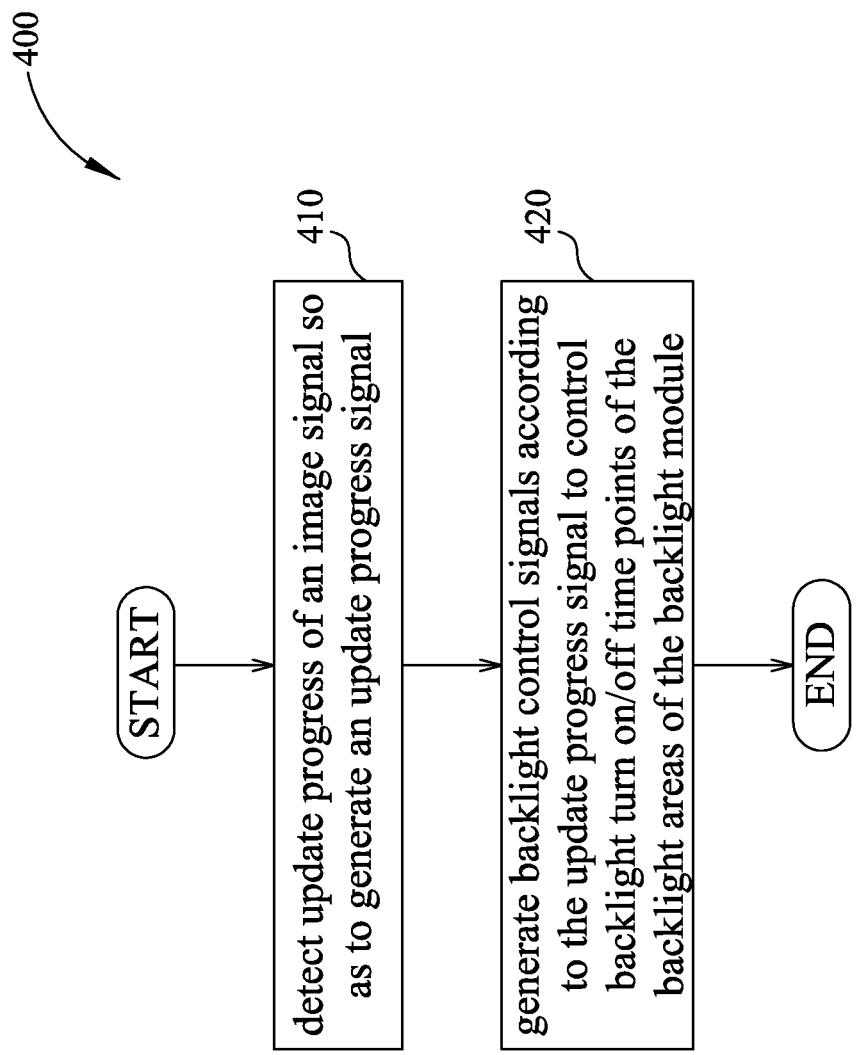
FIG. 4 is a flow chart of a backlight control method in accordance with an embodiment of the present invention.

FIG. 4 is a flow chart of a backlight control method 400 in accordance with an embodiment of the present invention. The backlight control method 400 is for controlling a backlight module of an LCD display for displaying 3D stereo images. The backlight control method 400 is applied to the backlight control apparatus 100 illustrated in FIG. 2, and is realized by the backlight control apparatus 100, for example. The backlight control method 400 is described below.

In Step 410, the image update progress detector 110 detects an update progress of an image signal I to generate an update progress signal 112 corresponding to the update progress. In practice, the counter circuit 116 of the image update progress detector 110 performs a count operation according to a first synchronous signal of the image signal I to generate at least one count value, and resets the count operation of the counter circuit 116 according to a second synchronous signal of the image signal I. After that, the image update progress detector 110 generates the update progress signal 112 representing the count value. In an embodiment, the first synchronous signal can be a horizontal synchronous signal HSYNC of the image signal I, and the second synchronous signal can be a vertical synchronous signal VSYNC of the image signal I. In another embodiment, the first synchronous signal can be a horizontal data enable signal of the image signal I, and the second synchronous signal can be a vertical data enable signal of the image signal I.

In Step 420, the backlight control signal generator 120 generates a plurality of backlight control signals according to the update progress signal 112, e.g., the foregoing backlight control signals C(1) to C($Y_{max}$), to control backlight on/off time points for each of the backlight areas; the examples are disclosed for illustration purpose and shall not be construed as limiting the present invention.

In this embodiment, the image signal I carries image data of a series of alternately left-eye and right-eye images. Accordingly, the backlight control method 400 is repeated frame by frame for example, and detailed thereof shall be further described with reference to FIG. 3 and FIG. 5.

In one embodiment, the backlight control signal generator 120 generates banded areas R(Y) and backlight control signals C(Y) according to the count value carried by the update progress signal 112 and a control parameter 118, and the control parameter 118 comprises a group of predetermined values, (n+Δ), (2*n+Δ), ..., and ($Y_{max}$*n+Δ), which are referred to as predetermined values (Y*n+Δ), where Y is from 1 to $Y_{max}$. By taking into consideration of a possibility that images to be updated within adjacent banded areas may be seen by users as a result of a transition time needed by the LCD display and backlight leakage, the predetermined values are adjusted according to a parameter Δ. Generally, the parameter Δ is greater or equal to zero, and whether to adopt the parameter Δ is determined according to requirements. When it is determined that the parameter Δ is applied to this method, the parameter Δ is defined as being greater than zero; otherwise, the parameter Δ is defined as being equal to zero, and thus the predetermined values (Y*n+Δ) are simplified to (Y*n). When the parameter Δ is equal to zero, the predetermined values (Y*n+Δ) respectively represent positions of pixel rows at the bottom of corresponding areas R(Y). Therefore, regardless that whether the parameter is greater than or equal to zero or simply greater than zero, the predetermined values (Y*n+Δ) can be provided to the backlight control signal generator 120 to monitor a variation range of the count value and to accordingly determine whether an image update progress arrives or exceeds the bottom of a certain banded area R(Y). For example, when the parameter Δ is equal to zero, the predetermined value (n+Δ) represents a position of the bottom pixel row of the banded area R(1), and accordingly the backlight control signal generator 120 monitors the foregoing count value. When the count value reaches the predetermined value (n+Δ), it means that the image update progress arrives (or exceeds when Δ is greater than zero) the bottom of the banded area R(1). Likewise, when the count value reaches (2*n+Δ), it means that the image update progress arrives (or exceeds when Δ is greater than zero) the bottom of the banded area R(2); other situations are similarly deduced.

It is to be noted that, the parameter n in the equations of each of the predetermined values represents the number of pixel rows of each of the banded areas R(Y), and each frame has N pixel rows, where ($Y_{max}$*n) is equal to N in this embodiment. The foregoing description is disclosed for illustration purposes and shall not be construed as limiting the present invention. According to a variation of this embodiment, the numbers of pixel rows in each of the banded areas R(Y) may be roughly the same, and the present invention need not comply with the foregoing principles. According to other variations of this embodiment, the numbers of pixel rows in each of the banded areas R(Y) may be different. Provided that the present invention can be realized, the numbers may be defined as desired. In addition, the predetermined values (Y*n+Δ) carried by the control parameter 118 can be generated by the backlight control apparatus 100. For example, the backlight control apparatus 100 further comprises a control unit (not shown in FIG. 2) for generating the predetermined values (Y*n+Δ), such that the backlight control signal generator 120 generates backlight control signals C(Y) according to the predetermined values (Y*n+Δ). The foregoing description is disclosed for illustration purposes and shall not be construed as limiting the present invention.

Figure 5:
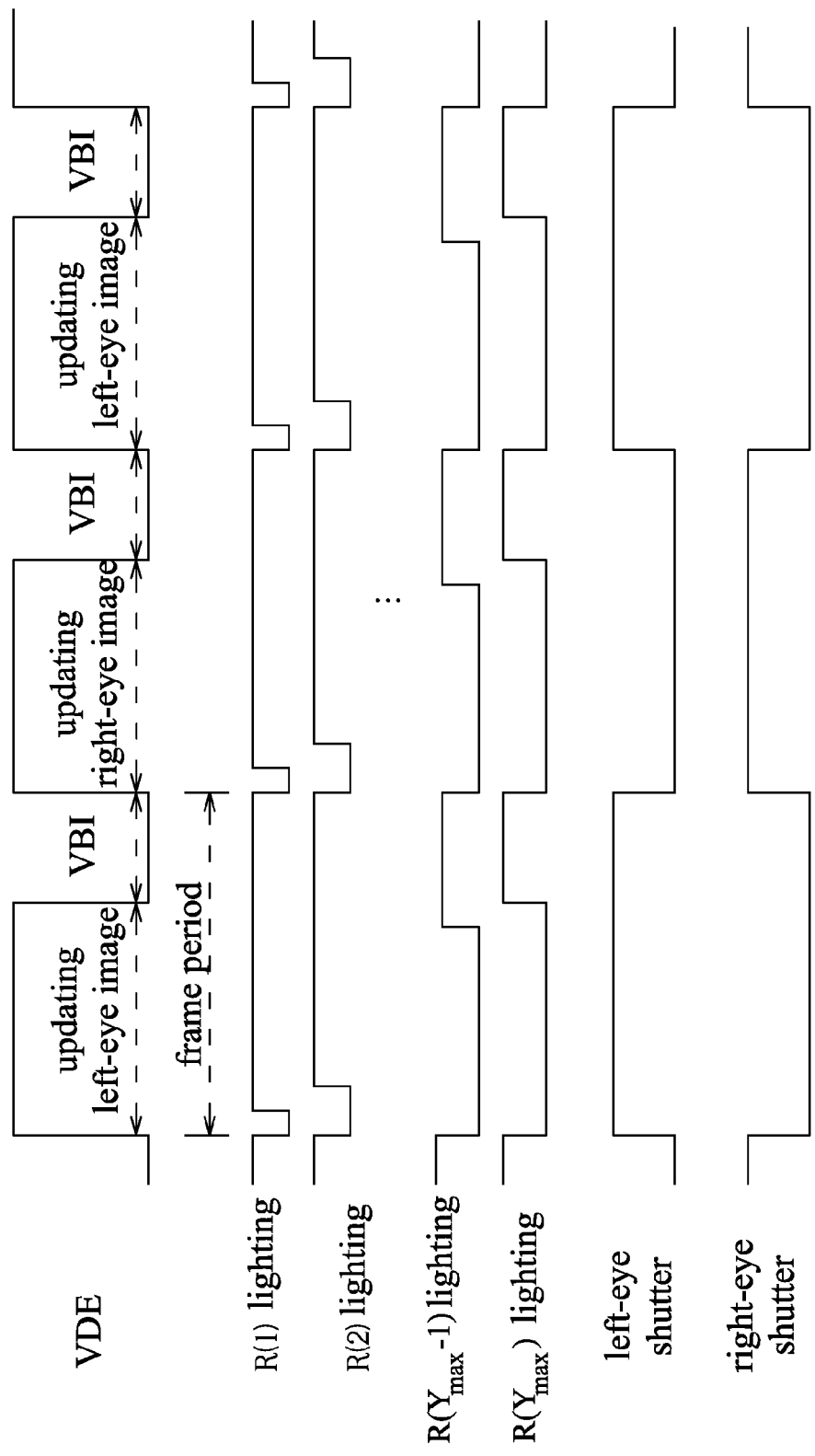
FIG. 5 is a schematic diagram of a timing control for the backlight control method illustrated in FIG. 4.

When each frame is updated and the image signal I is received at the image update progress detector (e.g., when a pulse of a vertical synchronous signal is received or when a vertical data enable signal is enabled), the backlight of each of the banded areas (R) is first turned off. After that, as pixel rows 1 to N of each of the frames are updated one after another, the counter circuit 116 inside the image update progress detector 110 performs a count operation according to a horizontal synchronous signal of the image signal I, so as to generate the update progress signal 112 carrying the count value. The backlight control signal generator 120 dynamically generates the backlight control signals C(Y) according to the count value of the update progress signal 112. FIG. 5 is a schematic diagram of a timing control for the backlight control method illustrated in FIG. 4. The backlight control signal generator 120 changes statuses of the backlight control signals C(Y) when the count value reaches to the predetermined values (Y*n+Δ) to control the backlight module to illuminate the banded areas R(Y). For example, when the count value is equal to the predetermined value (n+Δ), it means that the image update progress arrives or exceeds the bottom of the banded area R(1), i.e., image data within the banded area R(1) is already updated, so that the backlight control signal generator 120 turns on the backlight of the banded area R(1) via the backlight control signal C(1) to illuminate the banded area R(1). Accordingly, the display image displayed at the banded area R(1) at the time when acquiring illumination is always an updated image but not an image to be updated. Likewise, when the count value is equal to the predetermined value (2*n+Δ), it means that the image update progress arrives or exceeds the bottom of the banded area R(2), i.e., image data within the banded area R(2) is already updated, so that the backlight control signal generator 120 turns on the backlight of the banded area R(2) via the backlight control signal C(2). Accordingly, the display image displayed at the banded area R(2) at the time when acquiring illumination is always an updated image but not an image to be displayed.

Under control of the backlight control signals C(1) to C($Y_{max}$), the backlight module illuminates the banded areas R(1) to R($Y_{max}$) in sequence within a frame period. The timing lines for R(1) to R($Y_{max}$) illustrated in FIG. 5 show on/off statuses of backlights, varied with time, of the banded areas R(1) to R($Y_{max}$) More specifically, when the images begin to update, the backlights of all the banded areas are first turned off simultaneously, followed by turning on the backlights of the banded areas R(1) to R($Y_{max}$) in sequence according to the image update progress. In addition, when the counter circuit 116 inside the update progress detector 110 resets the foregoing count operation according to the second synchronous signal, the count value is restored to an initial value (e.g., zero) to operate the backlight control apparatus 100 periodically.

According to this embodiment, a pair of 3D stereo glasses using the described backlight control method alternately open right and left shutters, and need not correspondingly open the shutters only during a VBI as disclosed in the prior art. In practice, the backlight control apparatus 100 generates a notification signal to the pair of 3D stereo glasses when the image update progress detector 110 detects that a frame begins to be updated from receiving the image signal I (e.g., a pulse of a vertical synchronous signal is received or a vertical data enable signal begins to enable) to activate the pair of 3D stereo glasses to open a first shutter and simultaneously close a second shutter. The foregoing activating operation is performed via wire transmission or wireless transmission. According to a timing line of the left-eye shutter as illustrated in FIG. 5, the left-eye shutter is opened when the frame begins to be updated with the left-eye image and is closed when the frame begins to be updated with the right-eye image; and the right-eye shutter is opened when the frame begins to be updated with right-eye image and is closed when the frame begins to be updated with the left-eye image.

More particularly, left-eye and right-eye shutter signals in this embodiment are inverse signals; therefore, instead of needing to attend to opening time points for both the left-eye and right-eye shutters as disclosed in the prior art, one of the shutter signals can be generated according to the other shutter signal by merely using an inverter. Compared to the prior art, the architecture of the backlight control apparatus according to the present invention is simpler and more effective. Therefore, shutter control of the pair of 3D stereo glasses in this embodiment is realized more easily than that of a conventional pair of 3D stereo glasses, so that cost of 3D stereo display is effectively reduced.

When the banded areas R(1) to R($Y_{max}$) are illuminated from the top to the bottom according to the image update progress, each of the banded areas R(1) to R($Y_{max}$) has a different length of illumination duration T(Y), where Y is a positive integer between 1 to Y, and T(1)>T(2)> ... >T($Y_{max}$) When the banded areas R(Y) have a same backlight intensity, users may view that luminosities of the banded areas R(Y) are different, i.e., the banded area R(1) is brighter than the banded area R(2), the banded area R(2) is brighter than the banded area R(3), and so forth. Therefore, according to an embodiment of the present invention, the backlight control signal generator 120 generates the backlight control signals C(Y) according to the update progress signal 112 and the illumination duration T(Y) of the banded areas R(Y), such that a banded area having a shorter illumination duration has stronger backlight intensity. For example, the backlight control signal generator 120 controls the backlights of the banded areas R(Y) according to luminosity weights W(Y) to avoid different luminosities to human eyes. In this embodiment, the backlight control signal generator 120 determines the luminosity weights W(Y) according to an equation:

$$W(1)*T(1)=W(2)*T(2)= \ldots =W(Y_{max})*T(Y_{max}),$$

so that the banded areas R(Y) are provided with different backlight intensities according to lengths of the illumination duration. More particularly, the foregoing backlight control signal C(1) to C($Y_{max}$) are respectively pulse width modulation (PWM) signals PWM(1) to PWM($Y_{max}$). Accordingly, on/off statues of the backlights, varied with time, corresponding to the banded areas R(1) to R($Y_{max}$), are equivalent with those illustrated by lines of R(1) to R($Y_{max}$) in FIG. 5. However, the difference between the on/off statuses of the backlights in this embodiment and those illustrated in FIG. 5 is that the PWM signals PWM(1) to PWM($Y_{max}$) respectively control luminosity weights W(1) to W($Y_{max}$) via PMW duty cycles. In particular, PWM envelopes of the PWM signals PWM(1) to PWM($Y_{max}$) are the same as or similar to those illustrated by the lines of R(1) to R($Y_{max}$) in FIG. 5.

It is to be noted that, in this embodiment, the foregoing backlight control signals C(1) to C($Y_{max}$) replaced by the PWM signals PWM(1) to PWM($Y_{max}$) are disclosed for illustrative purposes, and shall not be construed as limiting the present invention. According to a variation of this embodiment, the backlight control signals C(1) to C($Y_{max}$) respectively control backlight turn on/off time points of the banded areas R(1) to R($Y_{max}$) but not the luminosity weights, and the backlight control signal generator 120 further comprises one or various weight output end/ends for outputting the foregoing luminosity weights to the backlight module. Similarities between this variation and foregoing embodiments shall not be described for brevity.

Compared to the prior art, a backlight control apparatus and an associated method are realized more easily than controlling shutters of a pair of 3D stereo glasses, and cost of the pair of 3D stereo glasses is correspondingly reduced.

In conclusion, according to the present invention, without generating interferences between left-eye images and right-eye images, 3D stereo display realized by a backlight control apparatus and an associated method significantly extend durations in opening shutters of a pair of 3D stereo glasses to provide a stronger image luminosity and reduce a switch frequency of the shutters of the pair of 3D stereo glasses, so that users do not tire easily while enjoying comfortable viewing experiences. Another advantage of the present invention is that the backlight control apparatus and the associated method are realized more easily than controlling the shutters of the pair of 3D stereo glasses, and cost of the 3D stereo glass is correspondingly reduced.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A backlight control apparatus, for controlling a backlight module of a liquid crystal display, the backlight control apparatus comprising:
    an image update progress detector, configured for detecting an update progress of an image signal and generating an update progress signal comprising a count value, said image update progress detector comprising:
        a counter circuit, configured for performing a count operation of counting a number of updated pixel rows according to a horizontal synchronous signal of the image signal to generate said count value, and resetting the count operation according to a vertical synchronous signal of the image signal;
    a backlight control signal generator, configured for generating a first backlight control signal and a second backlight control signal according to the update progress signal, wherein the backlight module comprises a first backlight area and a second backlight area;
    wherein the backlight control signal generator generates the first backlight control signal when the count value is equal to a first predetermined value, the first backlight control signal turns on backlights of the first backlight area, and the backlights of the first backlight area stay on until end of a frame period of the image signal; and
    wherein the backlight control signal generator generates the second backlight control signal when the count value is equal to a second predetermined value, the second backlight control signal turns on backlights of the second backlight area, and the backlights of the second backlight area stay on until end of the frame period of the image signal;
    wherein the first backlight control signal sets the first backlight area to an illumination intensity W(1) and an illumination duration T(1);
    wherein the second backlight control signal sets the second backlight area to an illumination intensity W(2) and an illumination duration T(2); and
    wherein W(1) is different from W(2), and T(1) is different from T(2).

2. The backlight control apparatus as claimed in claim 1, wherein the first backlight area and the second backlight area form a first banded area and a second banded area in a vertical direction, respectively.

3. The backlight control apparatus as claimed in claim 1, wherein W(1)×T(1)=W(2)×T(2).

4. The backlight control apparatus as claimed in claim 1, wherein the first backlight area has a longer illumination duration and a smaller illumination intensity than that of the second backlight area.

5. The backlight control apparatus as claimed in claim 1, wherein the backlight module comprises light-emitting diodes (LEDs).

6. The backlight control apparatus as claimed in claim 1, wherein the image signal alternately comprises left-eye images and right-eye images.

7. The backlight control apparatus as claimed in claim 1,
    wherein the backlight control signal generator further generates a glasses control signal according to the update progress signal to control a pair of three-dimensional (3D) stereo glasses;
    wherein the pair of 3D stereo glasses opens a first shutter and simultaneously closes a second shutter when the image update progress detector detects beginning of the frame period.

8. A backlight control method, for controlling a backlight module of a liquid crystal display, the backlight control method comprising:
    detecting an update progress of an image signal to generate an update progress signal comprising a count value, said update progress detecting step comprising:
        performing a count operation of counting the number of updated pixel rows according to a horizontal synchronous signal of the image signal to generate the count value; and
        resetting the count operation according a vertical synchronous signal of the image signal;
    generating a first backlight control signal when the count value is equal to a first determined value, generating a second backlight control signal when that count value is equal to a second predetermined value;
    wherein the backlight module comprises a first backlight area and a second backlight area, and the first backlight control signal turns on backlights of the first backlight area and the backlights of the first backlight area stay on until end of a frame period of the image signal, the second backlight control signal turns on backlights of the second backlight area and the backlights of the second backlight area stay on until end of the frame period of the image signal;

wherein the first backlight control signal sets the first backlight area to an illumination intensity W(1) and an illumination duration T(1);

wherein the second backlight control signal sets the second backlight area to an illumination intensity W(2) and an illumination duration T(2); and wherein W(1) is different from W(2), and T(1) is different from T(2).

9. The backlight control method as claimed in claim 8, wherein the first backlight area and the second backlight area form a first banded area and a second banded area in a vertical direction, respectively.

10. The backlight control method as claimed in claim 8, wherein W(1)×T(1)=W(2)×T(2).

11. The backlight control method as claimed in claim 8, wherein the first backlight area has a longer illumination duration and a smaller illumination intensity than the second backlight area.

12. The backlight control method as claimed in claim 8, wherein the backlight module comprises LEDs.

13. The backlight control method as claimed in claim 8, wherein the image signal alternately comprises left-eye images and right-eye images.

14. The backlight control method as claimed in claim 8, further comprising:

generating a glasses control signal according to the update progress signal to control a pair of 3D stereo glasses;

wherein the pair of 3D stereo glasses opens a first shutter and simultaneously closes a second shutter when the image update progress detector detects beginning of the frame period.

\* \* \* \* \*